(12) United States Patent
Sebille

(10) Patent No.: US 6,195,276 B1
(45) Date of Patent: *Feb. 27, 2001

(54) CONTROLLER FOR A GRAETZ SWITCH BRIDGE RECTIFIER FOR AN ALTERNATOR

(75) Inventor: Dominique Sebille, Arcueil (FR)

(73) Assignee: Valeo Equipments Electriques Moteur, Creteil (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,954

(22) Filed: Oct. 14, 1998

(30) Foreign Application Priority Data

Oct. 15, 1997 (FR) .................................................. 97 12879

(51) Int. Cl.[7] ........................... H02M 5/45; H02M 5/458; H02M 7/00; H02M 7/68
(52) U.S. Cl. .............................. 363/127; 363/37; 363/69; 363/89
(58) Field of Search .................................... 363/126, 127, 363/84, 89, 69, 67, 34, 37, 70

(56) References Cited

U.S. PATENT DOCUMENTS

| | | | | |
|---|---|---|---|---|
| 4,186,435 | * | 1/1980 | Cailloux | 363/37 |
| 4,348,630 | * | 9/1982 | Boenig et al. | 323/207 |
| 4,412,169 | * | 10/1983 | Dell'orto | 320/123 |
| 4,456,870 | * | 6/1984 | Rodari | 363/69 |
| 4,501,933 | * | 2/1985 | Siligoni et al. | 363/127 |
| 4,507,525 | * | 3/1985 | Siligoni et al. | 363/127 |
| 5,444,291 | * | 8/1995 | Paparo et al. | 257/552 |
| 5,449,936 | * | 9/1995 | Paparo et al. | 257/337 |

FOREIGN PATENT DOCUMENTS

| | | | |
|---|---|---|---|
| 0 665 637 | 8/1995 | (EP) | H02P/9/48 |
| 0 762 596 | 3/1997 | (EP) | H02J/7/14 |

OTHER PUBLICATIONS

French Search Report dated Jun. 4, 1998.

* cited by examiner

Primary Examiner—Peter S. Wong
Assistant Examiner—Bao Q. Vu
(74) Attorney, Agent, or Firm—Morgan & Finnegan LLP

(57) ABSTRACT

A device for rectifying the output voltage of a multiphase alternator including a controlled switch Graetz bridge adapted to be connected to different phase lines of the alternator and means for controlling said switches to generate a rectified voltage, in which the control means include a diode type component Graetz bridge which generates signals for controlling the switches of the controlled Graetz bridge.

21 Claims, 2 Drawing Sheets

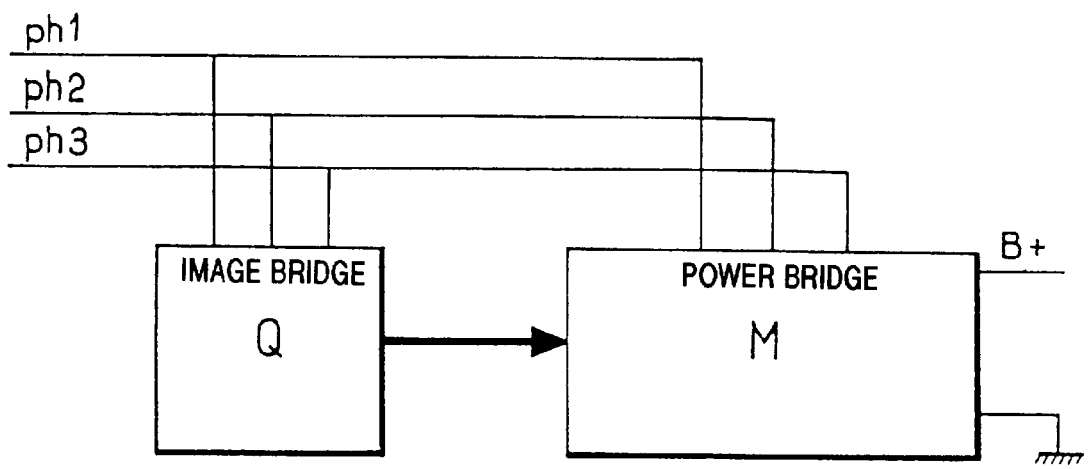
FIG_1
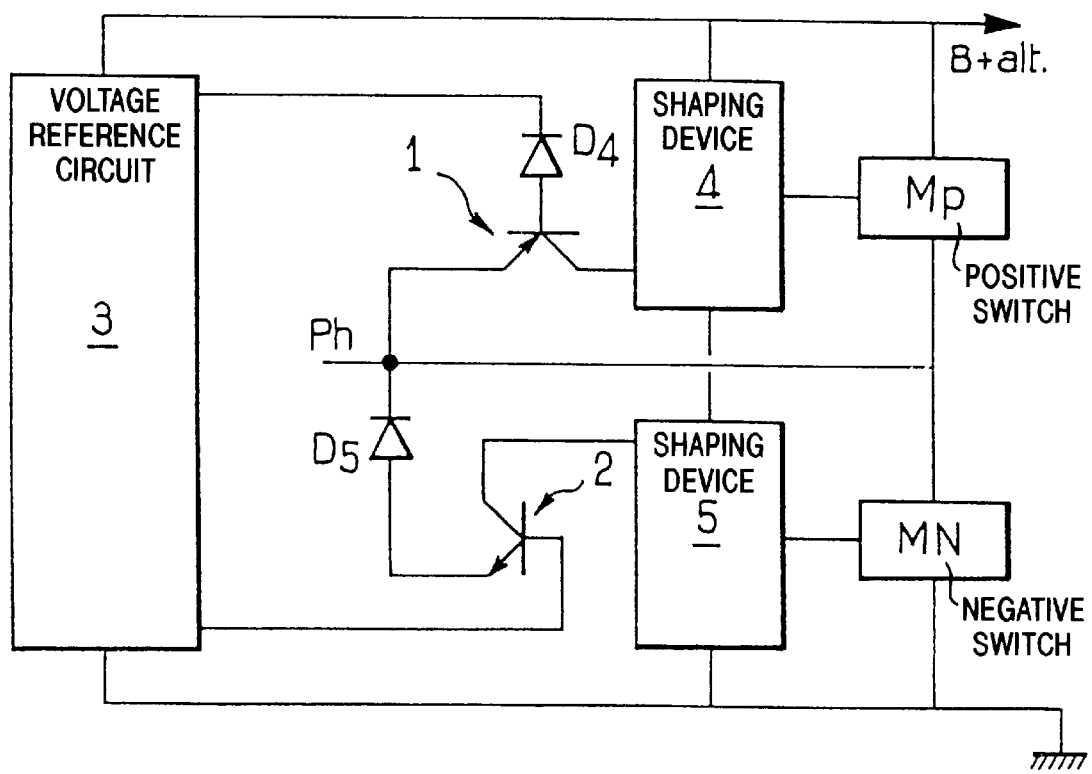
FIG_2

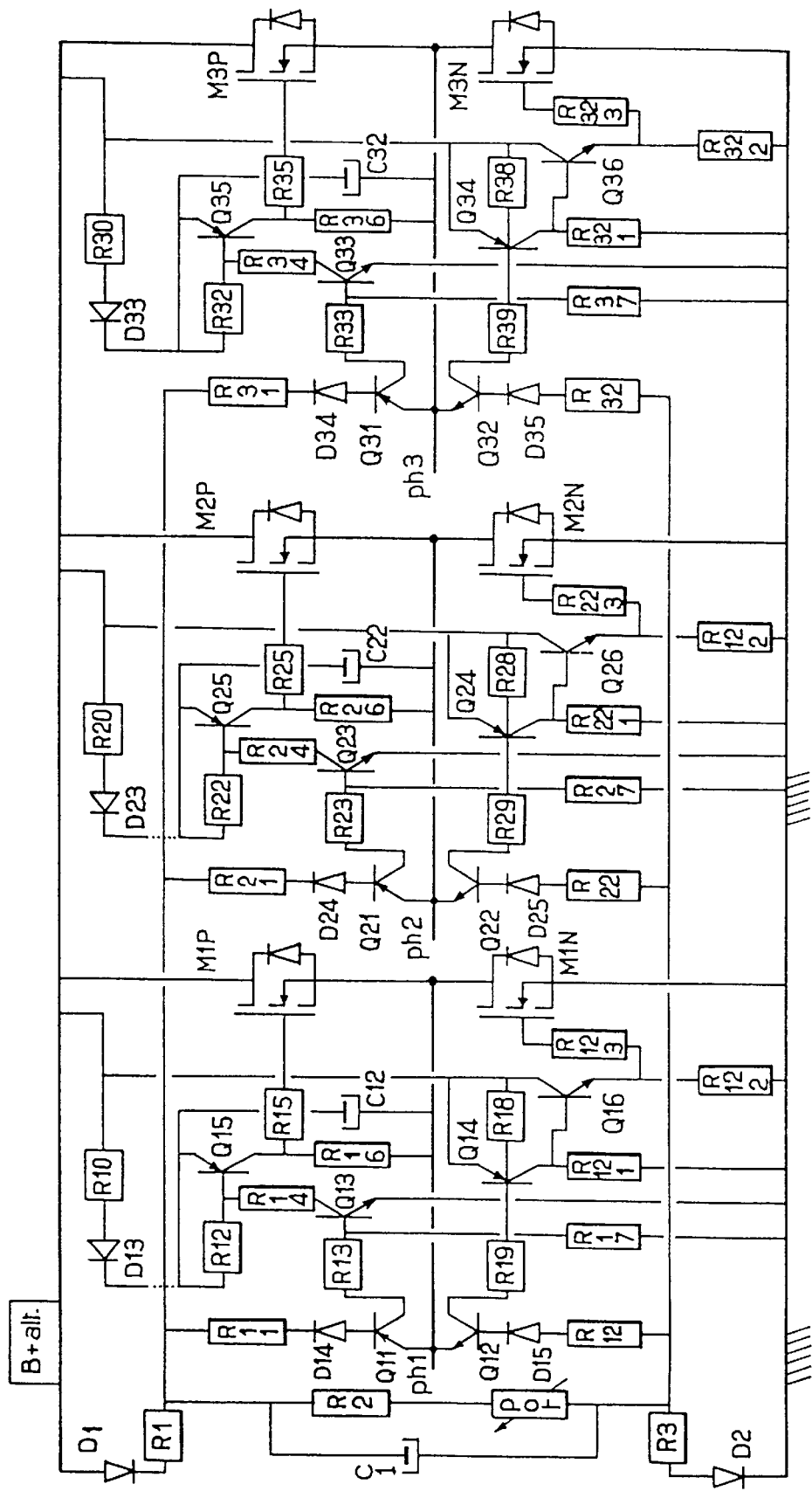
FIG_3

CONTROLLER FOR A GRAETZ SWITCH BRIDGE RECTIFIER FOR AN ALTERNATOR

FIELD OF THE INVENTION

The present invention relates to synchronous rectifier devices for alternators.

BACKGROUND OF THE INVENTION

It is clear that motor vehicles will in the future need more and more electrical energy to operate under optimal conditions in order to comply with new legislation that will come into force in the next few years, in particular concerning pollution.

The invention proposes a rectifier device that contributes to these objectives and which in particular improves the efficiency and the output of an alternator by reducing rectifier losses and iron losses in the stator and the rotor. The device proposed by the invention also reduces magnetic noise from the alternator by preventing non-linear switching of low-level current.

It is standard practice to use for rectifying the output voltage of a motor vehicle multiphase alternator Graetz full-wave rectifier bridges comprising switching circuits controlled synchronously with the voltages of the various phases of the armature.

In this connection reference is made to patent applications EP-665.637 and EP-762.596.

The switches used are generally enriched N-channel insulated gate transistors (usually called MOSFET). Compared to Graetz bridges using diodes, bridges using switches have the advantage of reducing the direct voltage drop at their terminals.

However, a rectifier bridge of the above kind for motor vehicles operates in an electrical environment subject to very high levels of interference and this can lead to irregularities in the controlling of the switches.

An object of the invention is to provide a rectifier device that mitigates these drawbacks.

The device proposed by the invention also has the advantage of being very low in cost and of being capable of withstanding high temperatures.

DISCUSSION OF THE INVENTION

According to the invention there is provided a device for rectifying the output voltage of a multiphase alternator including a controlled switch Graetz bridge adapted to be connected to different phase lines of the alternator, and control means for controlling said switches to generate a rectified voltage, wherein said control means include a diode type component Graetz bridge which generates signals for controlling the switches of the controlled Graetz bridge.

The diode type components are advantageously the base-emitter junctions of bipolar transistors.

For example, the emitters of said bipolar transistors are connected to the phase lines of the alternator and their collectors are connected to circuits for shaping the collector voltages or currents for controlling the switches of the switch bridge.

In a first embodiment the bases of the two transistors whose emitters are connected to the same phase line are connected between ground and the rectified output of the controlled switch bridge.

In a different embodiment the device includes a voltage adjusting circuit to the terminals of which are connected the bases of two transistors whose emitters are connected to the same phase line.

For example, the voltage adjusting circuit advantageously includes variable impedance means and in particular variable resistance means.

The device preferably includes diodes for protecting the base-emitter junctions of bipolar transistors.

The controlled switches are preferably of the MOSFET type.

For example, the means for shaping the collector voltages or currents that control the gates of the positive switches of the Graetz bridge include voltage offsetting means.

Other features and advantages of the invention will emerge further from the following illustrative and non-limiting description and the accompanying drawings.

BRIEF DESCRIPTION OF THE DRAWINGS

FIG. 1 is a block diagram of one embodiment of a rectifier device in accordance with the invention;

FIG. 2 is a block diagram of the block Q from FIG. 1;

FIG. 3 is a circuit schematic of one implementation of the device from FIG. 1.

DESCRIPTION OF THE PREFERRED EMBODIMENTS OF THE INVENTION

FIG. 1 shows three output phases Ph1, Ph2 and Ph3 of three windings of a three-phase alternator for use in a motor vehicle.

The rectifier device shown in FIG. 1 is connected between ground and a rectified output at which there is generated a voltage B+alt which is used to charge the battery of the vehicle, for example.

The device includes a power bridge (slave bridge) M in the form of a controlled switch Graetz bridge which rectifies the voltages on the phase lines Ph1, Ph2 and Ph3.

The device also includes a low-power circuit Q (i.e. a circuit carrying currents less than 100 mA) referred to hereinafter as the image bridge. The image bridge Q is a Graetz bridge with diodes or equivalent components in which the mid-points of the various half-bridges are connected to the respective phase lines Ph1, Ph2 and Ph3 and the potentials at the ends of those half-bridges control the switches of the bridge M.

A structure of the above type combines the advantages of Graetz diode bridges and Graetz switch bridges: the advantage of the inherent switching of the diodes is enjoyed without any output voltage drop because the Graetz switch bridge features a very low voltage drop, especially if the switches are of the MOSFET type. Because of the image bridge Q the switches are controlled in a reliable manner: the image bridge Q reacts in substantially the same manner as a standard diode bridge and transmits the control information instantaneously to the switches of the slave bridge M. The switches are therefore controlled in a particularly reliable fashion and this enables open loop operation without electronic feedback.

The diodes of the branches of the bridge Q are advantageously the base-emitter junctions of bipolar transistors.

For example, as shown in FIG. 2, the two diodes of a Graetz bridge that are connected to the same phase line Ph are the base-emitter junctions of two bipolar transistors 1 and 2 respectively of the PNP and NPN type whose emitters are connected to said phase line Ph and whose bases are connected either between ground and the rectified output of the bridge M or to the terminals of a voltage reference circuit 3 which receives the rectified output of the power bridge M.

A circuit 3 of the above kind refers the conduction threshold of the base-emitter junctions of the transistors 1 and 2 to controlled potentials rather than to the potential B+alt and ground potential.

The collectors of the transistors 1 and 2 generate control signals. They are connected to respective circuits 4 and 5 controlling the two switches of the bridge M which are connected to the same phase line, the circuit 4 controlling the positive switch MP (i.e. the one connected to the rectified voltage line B+alt) and the circuit 5 controlling the negative switch MN (i.e. the one connected to ground).

Standard base-emitter junctions cannot withstand voltages higher than 12 volts. To prevent avalanche breakdown of the transistors 1 and 2 protective diodes D4 and D5 are advantageously provided, for example between the base of the transistor 1 and the voltage reference circuit 3 for the first, conducting in the direction from said base towards said circuit 3, and between the emitter of the transistor 2 and the phase line Ph for the second, conducting in the direction from said emitter towards said phase line.

Alternatively, the transistors 1 and 2 can be chosen so that their base-emitter junctions can withstand voltages greater than 30 V in which case series diodes are no longer needed, in particular if the phase voltages are in the order of 11 Volts.

The circuits 4 and 5 shape the signals that correspond to the collector voltages of the bipolar transistors 1 and 2 for controlling the gates of the MOSFET switches MP and MN.

The circuit 4 for controlling the gate of the negative switch MN is a standard signal shaping device, for example.

The circuit 5 for controlling the gate of the positive switch MP includes a voltage offsetting device for raising the potential above the alternator output voltage B+alt.

FIG. 3 is a complete circuit schematic of a rectifier circuit constituting one embodiment of the invention.

In FIG. 3 the respectively positive and negative switches M1P, M2P, M3P and M1N, M2N and M3N are connected to the phase lines Ph1, Ph2 and Ph3 of a controlled switch Graetz bridge corresponding to the bridge M from FIG. 1. Note that the power switches can be made up of one or more MOSFET in parallel.

The transistors that constitute the diodes of the bridge Q and which are respectively connected to each of the three phases are denoted Q11, Q21 and Q31 in the case of those that correspond to the transistors 1 from FIG. 2 and Q12, Q22 and Q32 in the case of those that correspond to the transistors 2.

The voltage regulator circuit 3 includes a capacitor C1 connected in parallel with a fixed resistor R2 and a resistor POT that is advantageously a variable resistor. At one end this sub-circuit is connected to the rectified output of the alternator (voltage B+alt) by a resistor R1 and a diode D1 which conducts in the direction from said rectified output to said sub-circuit. At the other end the sub-circuit is connected to ground by a resistor R3 and a diode D2 which conducts in the direction from said sub-circuit to ground.

The bases of the transistors Q11, Q21, Q31 are connected to the common point between the sub-circuit D1, R1 and the sub-circuit C1, POT, R2 by respective diodes D11, D21, D31 connected in series with respective resistors R11, R21, R31.

The bases of the transistors Q12, Q22, Q32 are connected to the common point between the sub-circuit D2, R3 and the sub-circuit C1, POT, R2 by respective diodes D15, D25, D35 in series with respective resistors R12, R22, R32.

The values of the above resistors, and in particular that of the resistor POT when it is a variable resistor, are chosen and adjusted to achieve fine adjustment of the switching times of the switches M1P, M2P, M3P, M1N, M2N, M3N and to optimize their conduction times. This optimizes the efficiency of the machine and prevents temporary short-circuits due to simultaneous conduction of two switches in one arm of the slave bridge, which could short-circuit two phases of the alternator.

The circuits 5 for shaping the collector currents of the transistors Q12, Q22, Q32 include a resistor R19, R29, R39 connected to the base of a PNP transistor Q14, Q24, Q34 whose emitter is connected to the rectified voltage line.

The collector of the transistors Q14, Q24, Q34 is connected to ground via a resistor R121, R221, R321. It is also connected to the base of an NPN transistor Q16, Q26, Q36 whose collector is connected to the rectified voltage line and whose emitter controls the gate of the respective MOSFET switches M1N, M2N, M3N.

The circuits 4 for controlling and shaping the output signals at the collectors of the transistors Q11, Q21, Q31 include an NPN transistor Q13, Q23, Q33 whose base is connected to said collector via a resistor R13, R23, R33. The emitter of this transistor is connected to ground. Its collector is connected to the base of a transistor Q15, Q25, Q35 via a resistor R14, R24, R34. The base is also connected to the rectified voltage line via a circuit that includes in series resistors R12, R22, R32, diodes D13, D23, D33 and resistors R10, R20 and R30, said diodes conducting from said rectified voltage line towards said base.

The collector of the transistors Q15, Q25 and Q35 controls the gate of the transistors M1P, M2P and M3P via a resistor R15, R25 and R35. This collector is also connected to the phase lines Ph1, Ph2 and Ph3 via resistors R16, R26 and R36. The emitter of these transistors is connected to said phases via capacitors C12, C22 and C32 and to the common points between the resistors R12, R22, R32 and the diodes D13, D23 and D33.

A circuit 4 of the above kind shapes the signals from the image bridge Q by offsetting the voltage level for the purposes of controlling the positive switches.

A circuit of the type shown in FIG. 3 has the advantage of reducing conduction losses in the diodes of the bridge and the electromotive force induced in the stator of the machine. The total improvement in efficiency can be more than 10%, depending on operating conditions.

Because the switches are controlled efficiently regardless of the speed and output of the alternator a rectifier device in accordance with the invention has the advantage of enabling lower alternator starting speeds and higher output at low speed.

It also reduces acoustic noise and iron losses in the alternator.

Note also that one advantage of the devices just described is their suitability for integration into ASIC.

Another advantage of devices in accordance with the invention is the ability of their switch control arrangements to produce the waveforms of a motor vehicle alternator type synchronous machine even though those waveforms can be very different from those of a conventional three-phase AC line voltage, in particular because they include many harmonics, the impedances of the various windings are often out of balance and their frequency, output, waveform, etc can vary greatly from one alternator to another.

All the above features improve the overall behavior of an alternator, reducing fuel consumption for the same generated electrical power.

What is claimed is:

1. A device for rectifying output voltage of a multiphase alternator, comprising:
   a controlled switch Graetz bridge, adapted to be connected to different phase lines of the alternator, including switches; and
   control means to control the switches to generate a rectified voltage, the control means including a Graetz diode bridge, adapted to connect to different phase lines of the alternator, to generate signals to control the switches.

2. The device according to claim 1, wherein the diode type component bridge includes diode type components comprising base-emitter junctions of bipolar transistors.

3. The device according to claim 2, wherein emitters of the bipolar transistors are connected to the phase lines and collectors of the bipolar transistors are connected to circuits for shaping collector voltages or currents for controlling the switches.

4. The device according to claim 2, wherein bases of two bipolar transistors whose emitters are connected to the same phase line are connected between ground and a rectified output of the switch bridge.

5. The device according to claim 2, further comprising a voltage adjusting circuit having terminals which are connected to bases of two bipolar transistors whose emitters are connected to the same phase line.

6. The device according to claim 5, wherein the voltage adjusting circuit includes variable impedance means.

7. The device according to claim 6, wherein the variable impedance means includes variable resistance means.

8. The device according to claim 2, further comprising diodes for protecting the base-emitter junctions of bipolar transistors.

9. The device according to claim 1, wherein the switches are of the MOSFET type.

10. Device according to claim 3, wherein the switches are of the MOSFET type and the circuits for shaping the collector voltages or currents that control gates of positive switches of the switch Graetz bridge include voltage offsetting means.

11. A device for rectifying output voltage of a multiphase alternator, comprising:
    a power bridge, adapted to connect to different phase lines of the alternator, to rectify voltage on the phase lines; and
    an image bridge to generate signals to control the power bridge to generate the rectified voltage, the image bridge comprising a Graetz diode bridge adapted to connect to different phase lines of the alternator.

12. The device according to claim 11, wherein the power bridge includes switches controlled by the image bridge via the signals.

13. The device according to claim 12, wherein the switches comprise MOSFET-type switches.

14. The device according to claim 11, wherein the Graetz diode bridge includes diodes comprising base-emitter junctions of bipolar transistors.

15. The device according to claim 14, further comprising circuits for shaping collector voltages or currents of bipolar transistors, emitters of the bipolar transistors being connected to the phase lines and collectors of the bipolar transistors being connected to the circuits for shaping to control the switches.

16. The device according to claim 15, wherein the circuits for shaping include voltage offset means.

17. The device according to claim 11, further comprising a voltage adjusting circuit having terminals which are connected to bases of two transistors whose emitters are connected to the same phase line.

18. The device according to claim 11, wherein the image bridge controls the switches, via the signals, to enable open loop operation without electronic feedback.

19. A vehicle comprising:
    an alternator; and
    the device of claim 11.

20. A device for rectifying output voltage of a multiphase alternator, comprising:
    means, adapted to connect to different phase lines of the alternator, for rectifying a voltage on the phase lines; and
    a Graetz diode bridge, adapted to connect to different phase lines of the alternator, for generating signals to control the means for rectifying to rectify the voltage.

21. A method for rectifying output voltage of a multiphase alternator, comprising:
    rectifying voltages on phase lines of an alternator through the use of a Graetz switch bridge; and
    generating signals to control the Graetz switch bridge through the use of a Graetz diode bridge adapted to connect to different phase lines of the alternator.

* * * * *

UNITED STATES PATENT AND TRADEMARK OFFICE
CERTIFICATE OF CORRECTION

PATENT NO. : 6,195,276
DATED : February 27, 2001
INVENTOR(S) : Dominique Sebille Page 1 of 1

It is certified that error appears in the above-identified patent and that said Letters Patent is hereby corrected as shown below:

On title page:
In the Assignee, after "Valeo" change "Equipments" to --Equipements--.

In Claim 2 at Col. 5 lines 12-13, change "the title diode type component bridge includes diode type components" to --the Graetz diode bridge includes diodes--.

Signed and Sealed this

Fifth Day of June, 2001

Attest:

Attesting Officer

NICHOLAS P. GODICI
*Acting Director of the United States Patent and Trademark Office*